(12) United States Patent
Yeung et al.

(10) Patent No.: US 8,934,840 B1
(45) Date of Patent: Jan. 13, 2015

(54) METHOD AND APPARATUS FOR PERFORMING ARBITRATION AMONG A PLURALITY OF DRIVER CIRCUITS IN A COMMUNICATION DEVICE

(71) Applicant: Marvell International Ltd., Hamilton (BM)

(72) Inventors: Ken Yeung, Cupertino, CA (US); Ashutosh Mishra, Sunnyvale, CA (US); Harish Ramamurthy, Cupertino, CA (US); Hao Zhang, San Jose, CA (US)

(73) Assignee: Marvell International Ltd. (BM)

( * ) Notice: Subject to any disclaimer, the term of this patent is extended or adjusted under 35 U.S.C. 154(b) by 209 days.

(21) Appl. No.: 13/717,884

(22) Filed: Dec. 18, 2012

Related U.S. Application Data

(60) Provisional application No. 61/578,197, filed on Dec. 20, 2011.

(51) Int. Cl.
*H04B 7/00* (2006.01)
*H04W 28/02* (2009.01)
*H04W 84/18* (2009.01)

(52) U.S. Cl.
CPC .......... *H04W 28/0221* (2013.01); *H04W 84/18* (2013.01)
USPC ..................................... 455/41.2; 455/343.1

(58) Field of Classification Search
USPC ............... 370/311, 318, 339, 462; 455/343.1, 455/343.2, 41.2, 515, 574, 82; 710/36, 62, 710/104; 713/300, 320, 310, 30; 327/544, 327/1; 365/226, 227; 700/209, 295
See application file for complete search history.

(56) References Cited

U.S. PATENT DOCUMENTS

| 8,718,029 B1 * | 5/2014 | Wong et al. .................... 370/339 |
| 2004/0116075 A1 * | 6/2004 | Shoemake et al. ............ 455/41.2 |
| 2010/0285828 A1 * | 11/2010 | Panian et al. .................. 455/522 |
| 2010/0316027 A1 * | 12/2010 | Rick et al. ...................... 370/329 |
| 2014/0233444 A1 * | 8/2014 | Wang ............................. 370/311 |

* cited by examiner

*Primary Examiner* — Phuongchau Ba Nguyen

(57) ABSTRACT

Systems, methods, and other embodiments associated with performing arbitration among a plurality of driver circuits in a communication device are described. According to one embodiment, an apparatus includes a first source configured to transmit first packets and a second source configured to transmit second packets. The arbiter logic is configured to input a thermal management mode that is selected based, at least in part, on a thermal consequence of simultaneous transmission of packets from the first source and the second source. The arbiter logic is configured to select either i) the first packets, ii) the second packets, or iii) both the first packets and the second packets for transmission based, at least in part, on the thermal management mode input by the arbiter logic.

20 Claims, 8 Drawing Sheets

METHOD AND APPARATUS FOR PERFORMING ARBITRATION AMONG A PLURALITY OF DRIVER CIRCUITS IN A COMMUNICATION DEVICE

CROSS REFERENCE TO RELATED APPLICATIONS

This patent disclosure claims the benefit of U.S. Provisional Application Ser. No. 61/578,197 filed on Dec. 20, 2011, which is incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The trend for handheld devices (e.g., cell phones) is to provide more wireless features. It is not uncommon for modern cell phones to support communication by way of wireless local area network (WLAN), Bluetooth, long term evolution (LTE), and near field communication (NFC) tag reader. Driver circuits supporting each of these communication protocols are included within a cell phone, often on the same system-on-chip. Thermal management becomes an issue when multiple driver circuits are operating simultaneously, especially during high-power transmission operations.

SUMMARY

In general, in one aspect this specification discloses an apparatus for performing arbitration among a plurality of driver circuits in a communication device. The apparatus includes a first source, a second source, and an arbiter logic. The first source is configured to transmit first packets. The second source is configured to transmit second packets. The arbiter logic is configured to input a thermal management mode by which each of the first source and the second source is to respectively transmit the first packets and the second packets. The thermal management mode is selected based, at least in part, on a thermal consequence of simultaneous transmission of the first packets from the first source and the second packets from the second source. The arbiter logic is configured to select either i) the first packets, ii) the second packets, or iii) both the first packets and the second packets for transmission based, at least in part, on the thermal management mode input by the arbiter logic.

In general, in another aspect, this specification discloses a method for performing arbitration among a plurality of driver circuits in a communication device. The method includes receiving a first request from a first source to transmit first packets. The method includes receiving a second request from a second source to transmit second packets. The method includes inputting a thermal management mode by which each of the first source and the second source is to respectively transmit the first packets and the second packets. The thermal management mode is selected based, at least in part, on a thermal consequence of simultaneous transmission of the first packets from the first source and the second packets from the second source. The method includes selectively transmitting either i) the first packets, ii) the second packets, or iii) both the first packets and the second packets for transmission based, at least in part, on the thermal management mode.

In general, in another aspect, this specification discloses an integrated circuit for performing arbitration among a plurality of driver circuits in a communication device. The integrated includes a first source configured to transmit first packets and second source configured to transmit second packets. The integrated circuit includes an arbiter logic configured to input a thermal management mode by which each of the first source and the second source is to respectively transmit first packets and second packets, respectively. The thermal management mode is selected based, at least in part, on a thermal consequence of simultaneous transmission of the first packets from the first source and the second packets from the second source. The arbiter logic is further configured to selectively transmit either i) the first packets, ii) the second packets, or iii) both the first packets and the second packets for transmission based, at least in part, on the thermal management mode.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments, associated with packet arbitration for thermal management. In one embodiment, packet arbitration for thermal management corresponds to preventing simultaneous transmission of packets when such simultaneous transmission of packets is likely to cause overheating of a communication device. Excessive heat within a communication device may damage hardware and affect electrical connections within the device. Simultaneous transmission of multiple packets may cause undesirable heating in a communication device.

In one embodiment, a device includes an arbiter logic that can be placed in a thermal management mode when simultaneous transmission of packets may result in excessive heating of the device. When not in thermal management mode, the arbiter logic allows simultaneous transmission and/or reception of packets from multiple sources. However, when in thermal management mode, the arbiter logic selects and orders packets for transmission such that packets from multiple sources are not simultaneously transmitted. When not in thermal management mode, the arbiter logic allows transmission of packets from multiple sources simultaneously. In this manner, overheating of the communication device can be avoided.

Figure 1:
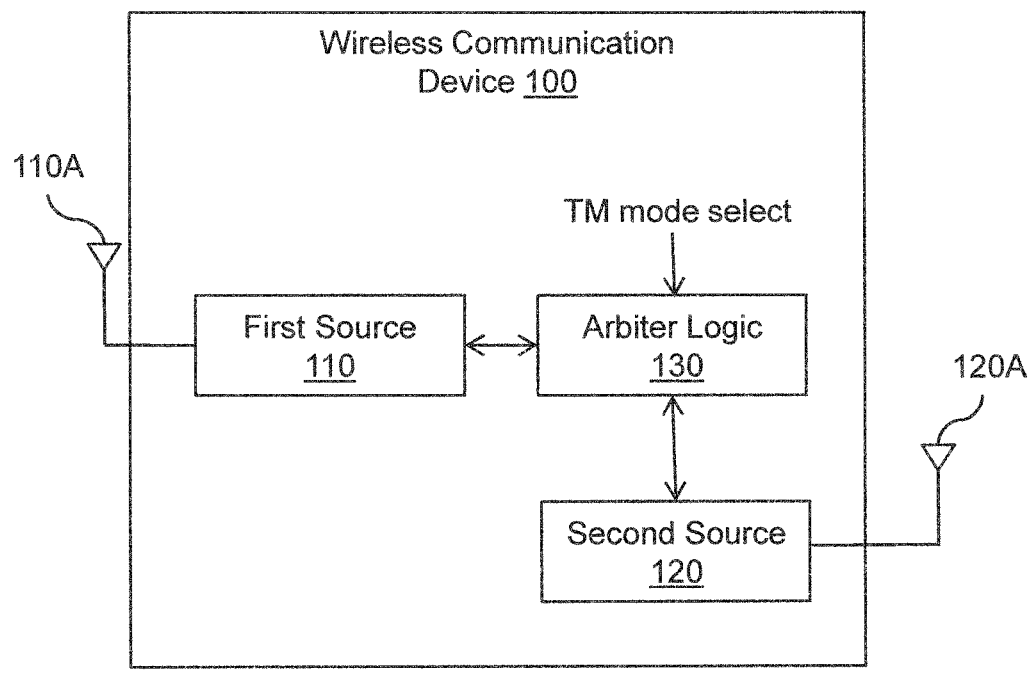
FIG. 1 illustrates one embodiment of an apparatus associated with packet arbitration for thermal management.

FIG. 1 illustrates one embodiment of a wireless communication device 100 that performs packet arbitration for thermal management. The device 100 includes a first source 110 that is configured to transmit packets and a second source 120 that is configured to transmit packets. The first source 110 includes a first antenna 110A for transmitting packets from the first source. The second source 120 includes a second antenna 120A for transmitting packets from the second source. In one embodiment, the wireless communication device 100 is implemented on a chip including one or more integrated circuits configured to perform one or more of the functions described herein.

In various embodiments, the first source 110 and second source 120 are driver circuits associated with one or more of an NFC driver, a WLAN driver, a Bluetooth driver, and an LTE driver. For the purposes of this description, the first source 110 is an NFC driver and the second source 120 is a WLAN driver. As compared to the Bluetooth driver and LTE driver, the NFC driver and the WLAN driver generally consume more power during transmission of packets, and thus generate more heat. In reader mode, the NFC driver provides radio frequency (rf) energy to a passive NFC tag to energize the tag so that the NFC tag sends a signal to the NFC driver circuit. When in reader mode, the NFC driver periodically transmits packets that include the rf energy to used to energize a passive NFC tag. In this reader mode, the NFC consumes about 250 mW of power. The WLAN driver typically draws around 250 mA per antenna during transmission. A WLAN driver operating with two antennas consumes 2 watts of power.

When the NFC driver is in reader mode and the WLAN driver is transmitting packets, significant heat is generated. Depending on ambient temperature and the length of time the NFC driver and WLAN driver simultaneously transmit packages, components in the device may be exposed to temperatures above the recommended operating range. Some devices separate the NFC driver/antenna from the WLAN driver/antenna. This distributes the heating affects of the two drivers, but may not prevent overheating in all cases.

The device 100 includes an arbiter logic 130. The arbiter logic 130 coordinates the transmission of packets from the first source 110 and second source 120. The arbiter logic 130 receives and grants transmit requests from the first source 110 and the second source 120. In one embodiment, the arbiter logic 130 also receives a priority associated with the transmit requests. In one embodiment, the arbiter logic 130 is a Bluetooth Coexistence Arbiter (BCA).

In one embodiment, a thermal management mode selection is made by a device component that is cognizant of the likelihood of overheating of the device 100. The thermal management mode selection is made by a processor that is monitoring an ambient temperature within the device 100. When the ambient temperature exceeds a predetermined limit, the processor makes a thermal management mode selection that activates thermal management mode. The arbiter logic 130 is configured to receive the thermal management mode selection and to operate in thermal management mode when the thermal management mode is active.

When the arbiter logic 130 operates in thermal management mode, transmit requests are selectively granted so that packets are selectively transmitted to reduce heating of the device 100. When in thermal management mode, the arbiter logic 130 follows a thermal management protocol. One embodiment of a thermal management protocol is outlined in FIGS. 2-5. In general, the thermal management protocol provides rules for prioritizing packets such that the arbiter logic 130 grants transmit requests to only a single source at any given time. When the thermal management mode is not active, the arbiter logic 130 grants transmit requests without the same thermal considerations of thermal management mode, meaning that in some instances both the first source 110 (e.g., NFC driver) and the second source 120 WLAN driver) are simultaneously granted permission to transmit packets.

Figure 2:
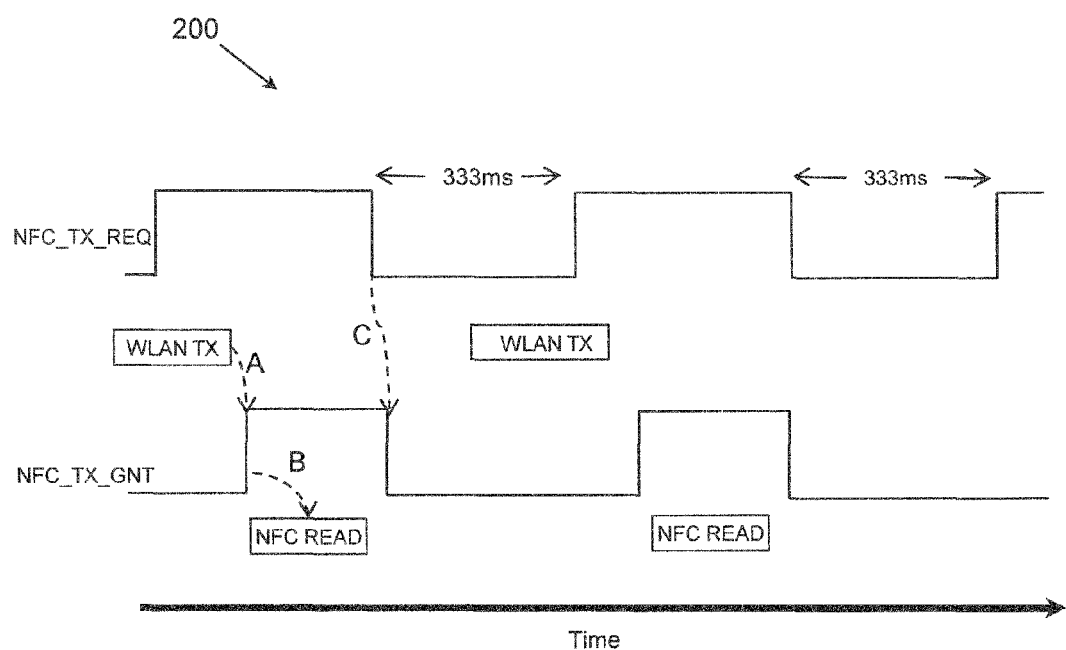
FIG. 2 illustrates a timing diagram that outlines one embodiment of packet arbitration for thermal management.

FIG. 2 illustrates a timing diagram 200 that outlines an aspect of one embodiment of a thermal management protocol performed by the arbiter logic 130 (FIG. 1) when the thermal management mode is active. When in reader mode, an NFC driver (e.g., first source 110, FIG. 1) generates a transmit request according to a predetermined interval (e.g., 333 ms as shown in the top waveform). The transmit request is a request to transmit packets from the communication device. If WLAN packets are being transmitting when the NFC transmit request is made, the NFC transmit request is not granted until the transmission have completed as shown by dashed line A on the bottom waveform. The NFC driver continues to assert the transmit request for the entire period, even though the request is not immediately granted.

The NFC driver then transmits packets as shown by dashed line B until an end of the periodic transmit request as shown by dashed line C. The length of time the NEC driver is allowed to transmit packets will vary (e.g., between 1 and 200 ms) depending on the duration of the WLAN packet transmission. In this manner, the thermal management protocol grants permission for a single packet source at a time. This avoids the simultaneous transmission of packets from multiple sources thereby reducing the heating affects inside the device of packet transmission.

Figure 3:
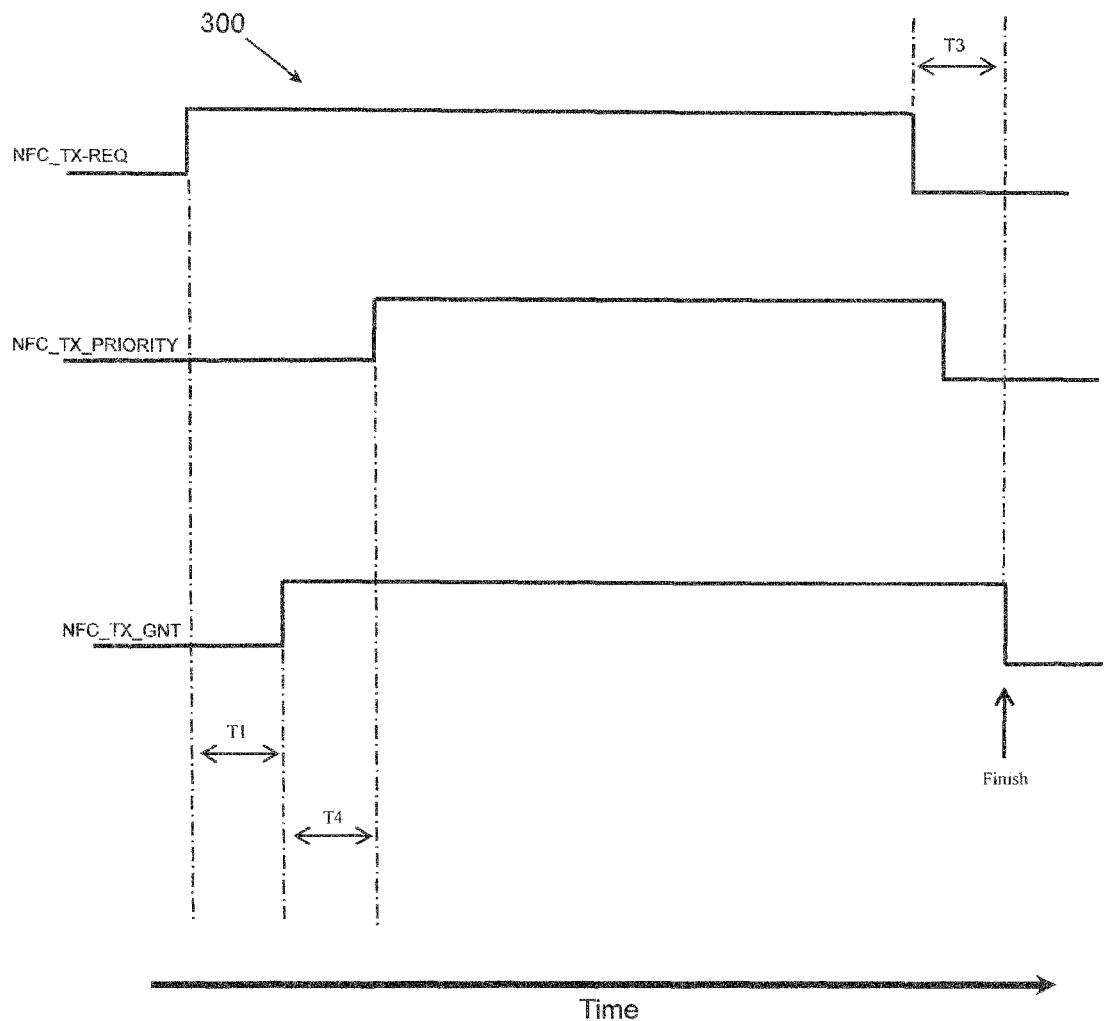
FIG. 3 illustrates a timing diagram that outlines one embodiment of packet arbitration for thermal management.

FIG. 3 illustrates another timing diagram 300 that outlines an aspect of one embodiment of a thermal management protocol performed by the arbiter logic 130 (FIG. 1) when the thermal management mode is active. At the start of T1 the NFC driver requests permission to transmit packets. During T1, transmission of any WLAN packets that are being transmitted is completed. At the end of T1, the NEC driver is granted permission to transmit. During T4, the NFC driver determines whether the transmission of packets should be assigned a high priority based on a response to initial packets that were sent. For example, if a tag is identified and is being read by the NEC driver, the NFC driver would assert transmit priority at the end of T4. During T4, WLAN transmit requests may or may not be granted, depending on the specific thermal management protocol. If a WLAN transmit request is granted, the NFC transmit request would be denied. At the end of T4, the NFC driver asserts transmit priority.

Depending on the specific thermal management protocol, when the NFC transmit priority is high, WLAN transmit requests may be denied and the NEC driver transmits packets. The NFC transmit request remains granted after the end of the transmit request during T3. T3 is typically relatively short, on the order of 100 ns. In this manner, a high priority transmit request can prevent other transmit requests from being granted until the high priority transmission is complete. In other embodiments, a WLAN transmission always has a higher priority than NFC transmissions and WLAN transmissions are never blocked by NFC transmissions.

Figure 4:
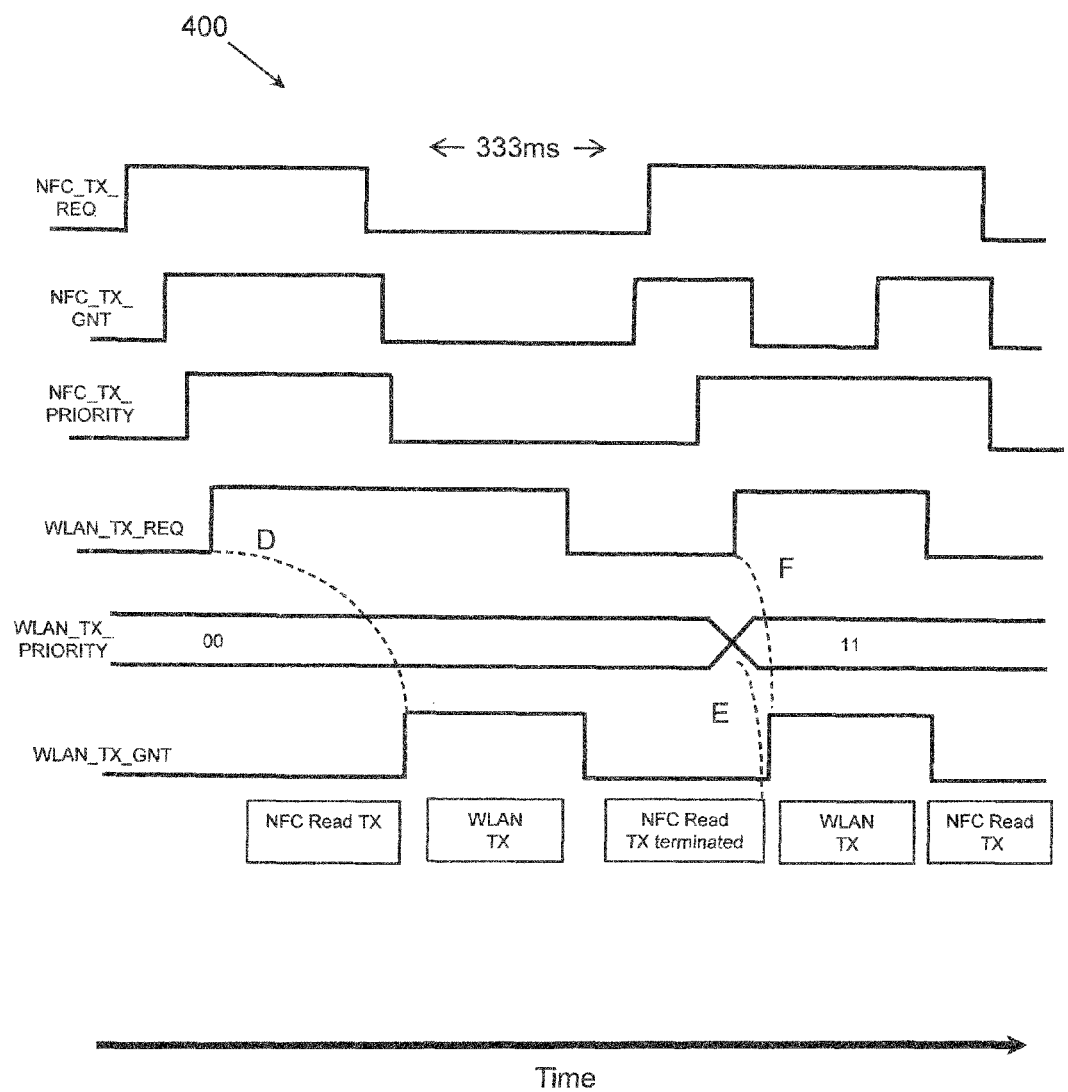
FIG. 4 illustrates a timing diagram that outlines one embodiment of packet arbitration for thermal management.

FIG. 4 illustrates another timing diagram 400 that outlines an aspect of one embodiment of a thermal management protocol performed by the arbiter logic 130 (FIG. 1) when the thermal management mode is active. In this embodiment, priority may be assigned to both the NFC transmit request and the WLAN transmit request and a high priority WLAN is given preference over NFC. At the beginning of the timing diagram 400, the NFC driver generates a transmit request and the request is granted. The NFC driver assigns a high priority to the transmit request. While the NFC transmit priority is high, a WLAN transmit request is made. The WLAN transmit request has a low (00) priority, so (as shown by dashed line D) the WLAN transmit request is not granted until the NFC transmit request is complete.

The NFC driver generates a second transmit request 333 ms after the first NFC transmit request. The second transmit request is granted. The NFC driver assigns a high priority to the transmit request. While the NFC transmit priority is high, a WLAN transmit request is made. The WLAN transmit request has a high (11) priority, so (as shown by dashed line E) the NFC transmit grant is terminated and NFC transmission ceases. The WLAN transmit request is immediately granted as shown by dashed line F and the high priority WLAN packets are transmitted. In this manner the WLAN driver is given preference over the NFC driver such that a high priority transmit request from the WLAN driver can cause an early transmit abort of high priority NFC packets.

Figure 5:
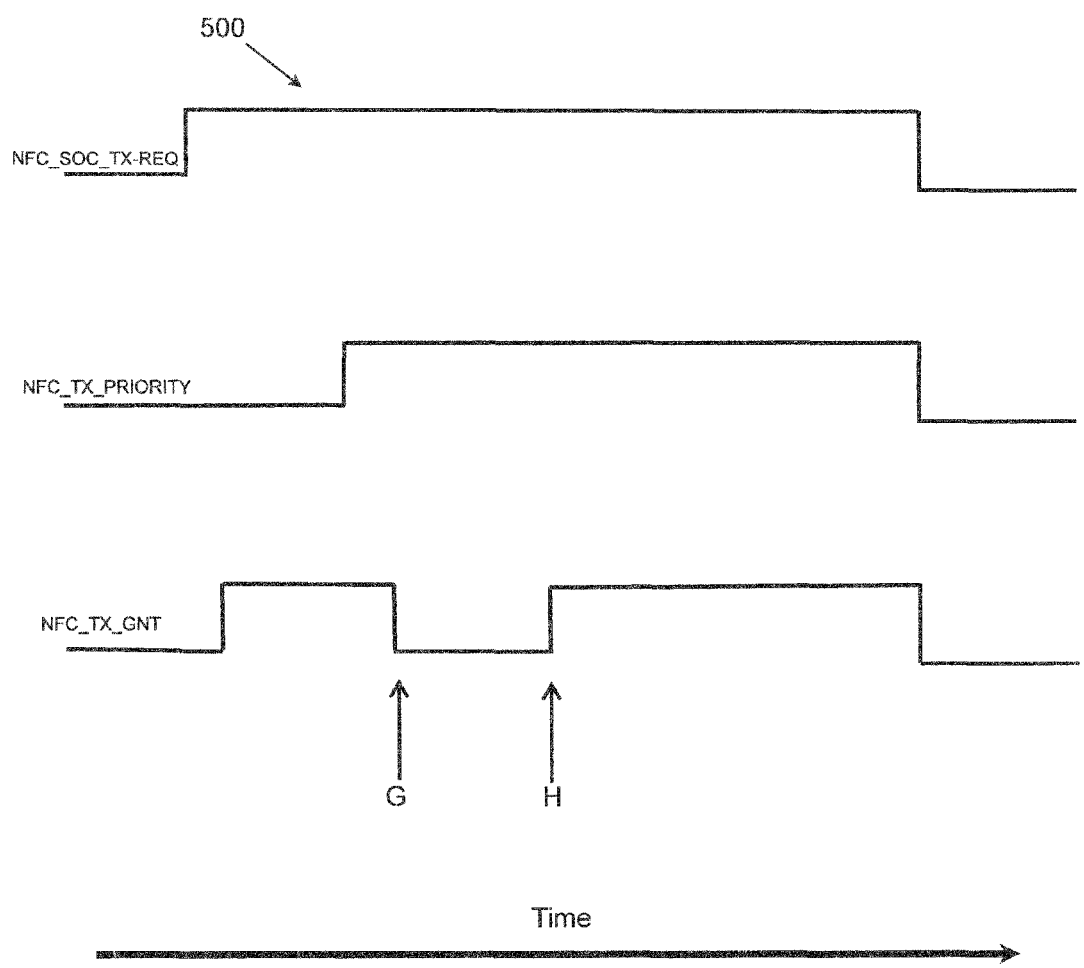
FIG. 5 illustrates a timing diagram that outlines one embodiment of packet arbitration for thermal management.

FIG. 5 illustrates another timing diagram 500 that outlines an aspect of one embodiment of a thermal management protocol performed by the arbiter logic 130 (FIG. 1) when the thermal management mode is active. In particular, FIG. 5 illustrates how the early transmit abort of a high priority NFC transmit request is handled. At G, the NFC transmit grant is terminated according to the thermal management protocol because a high priority transmit request is received from the WLAN driver. The NFC driver continues to assert both the transmit request and the high priority. At H, after the high priority WLAN packets are transmitted, the NFC transmit request is again granted and the NFC driver resumes transmission of packets.

Figure 6:
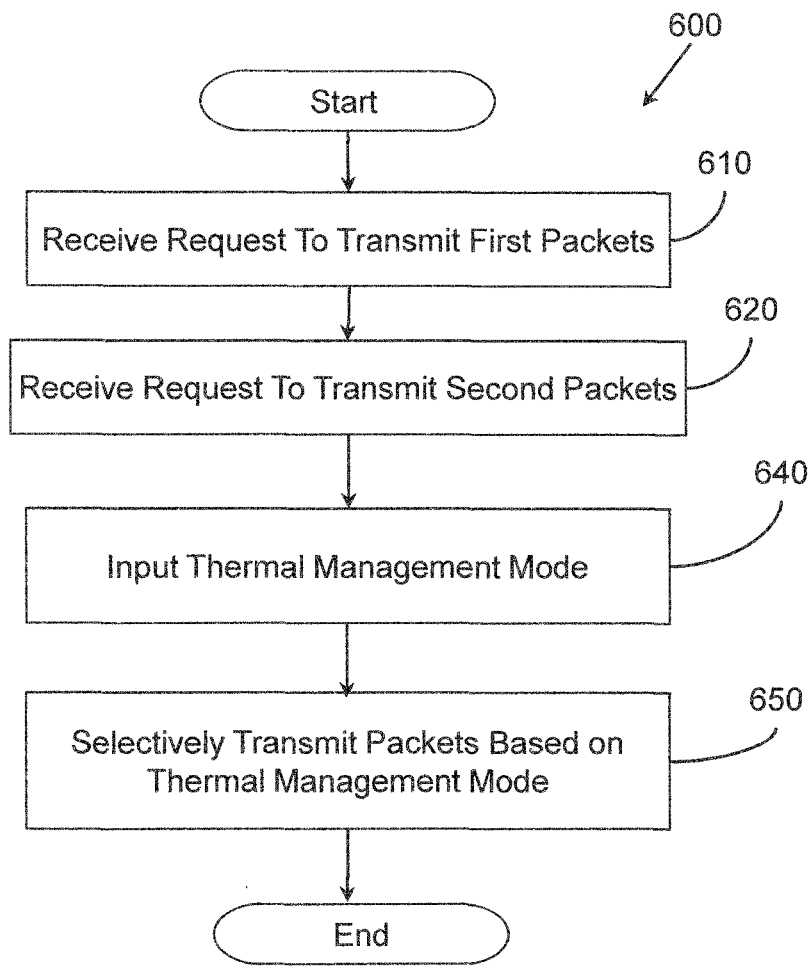
FIG. 6 illustrates one embodiment of a method associated with packet arbitration for thermal management.

FIG. 6 illustrates one embodiment of a method 600 for performing packet arbitration for thermal management. At 610, the method includes receiving a first request from a first source to transmit first packets. At 620, the method includes, while transmitting the first packets, receiving a second request from a second source to transmit second packets. At 640, the method includes determining a present thermal management mode. The thermal management mode is based, at least in part, on a thermal consequence of simultaneous transmission of packets from the first source and the second source. At 640, the method includes selectively transmitting packets based, at least in part, on the thermal management mode.

The thermal management mode may be determined based on power that is typically consumed during transmission of packets from the first source combined with power that is typically consumed during transmission of packets from the second source. The thermal management mode may also be determined based on an ambient temperature.

In one embodiment, when the thermal management mode is not active, the method includes transmitting both the first and second packets simultaneously. In one embodiment, when the thermal management mode is active, the method includes transmitting either the first packets or the second packets, such that the first packets and the second packets are not transmitted simultaneously.

When the thermal management mode is active, packets may be selectively transmitted, based, at least in part, on i) a first priority that is associated with the first packets and ii) a second priority that is associated with the second packets. The method includes determining a first priority associated with the first packets and determining a second priority associated with the second packets. When the second priority is higher than the first priority, the method includes ceasing transmission of the first packets and transmitting the second packets. When the first priority is higher than the second priority, the method includes i) continuing transmission of the first packets and ii) delaying transmitting the second packets until the transmitting of the first packets is complete.

When the first priority is the same as the second priority, the method includes selecting either the first packets or the second packets for transmission based on a thermal management protocol that prioritizes either the first source or the second source.

Figure 7:
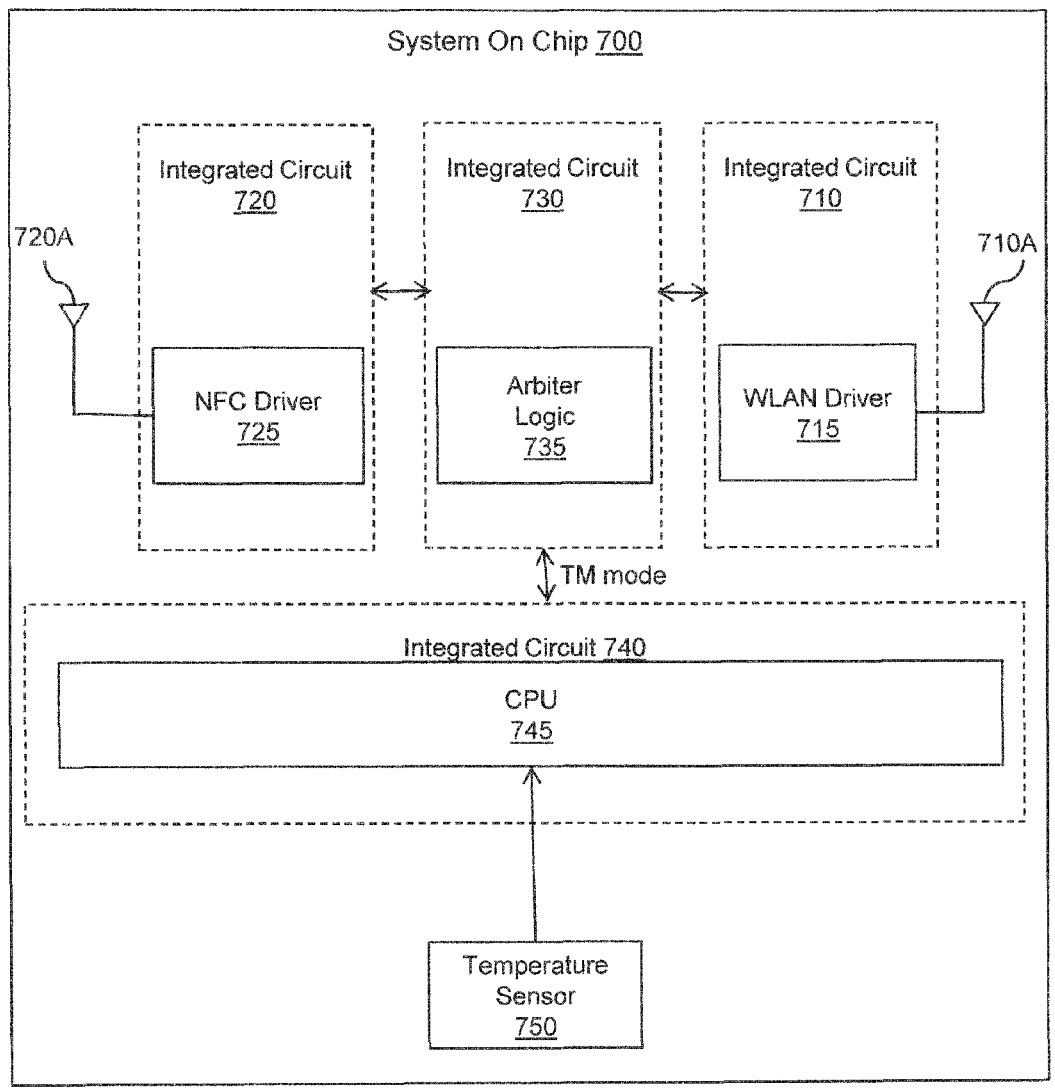
FIG. 7 illustrates one embodiment of an device that provides packet arbitration for thermal management.

FIG. 7 illustrates one embodiment of a system on chip 700 that performs packet arbitration for thermal management. In one embodiment, packet arbitration for thermal management corresponds to preventing simultaneous transmission of packets from multiple sources when simultaneous transmission of packets is likely to cause excessive heating within a device (e.g., silicon degradation). The system on chip 700 includes a first integrated circuit 710 that includes a WLAN driver circuit 715 and one or more WLAN antennas 710A. The system on chip 700 includes a second integrated circuit 720 that includes an NFC driver circuit 725 and one or more NFC antennas 720A. The system on chip 700 includes third integrated circuit 730 that includes an arbiter logic circuit 735. The arbiter logic 735 is configured to receive a thermal management mode selection input from a central processing unit 745 on a fourth integrated circuit 740. The arbiter logic circuit 735 coordinates transmission of packets from the WLAN driver circuit 715 and the NFC driver circuit 725 based on the selected thermal management mode as described above with respect to FIGS. 1-6.

The CPU 745 determines whether to select thermal management mode for the arbiter logic circuit 725 based on a thermal consequence of simultaneous transmission of packets from the WLAN driver circuit 715 and the NFC driver circuit 725. In one embodiment, the CPU 745 determines the thermal consequence of simultaneous packet transmission based on an ambient temperature provided by a temperature sensor 750. The CPU 745 may perform any suitable algorithm to determine whether to activate thermal management mode. The CPU 745 may consider typical power consumption for the WLAN driver circuit 715 and the NFC driver circuit 725 instead of or in addition to the ambient temperature. The CPU 745 may calculate a predicted resultant surface temperature of the system-on-chip based on the ambient temperature, a thermal coefficient for a substrate of the system on chip, and the power consumed simultaneous transmission of packets. If the predicted resultant temperature exceeds a predetermined limit (e.g., 125° C.), the CPU may select thermal management mode.

Figure 8:
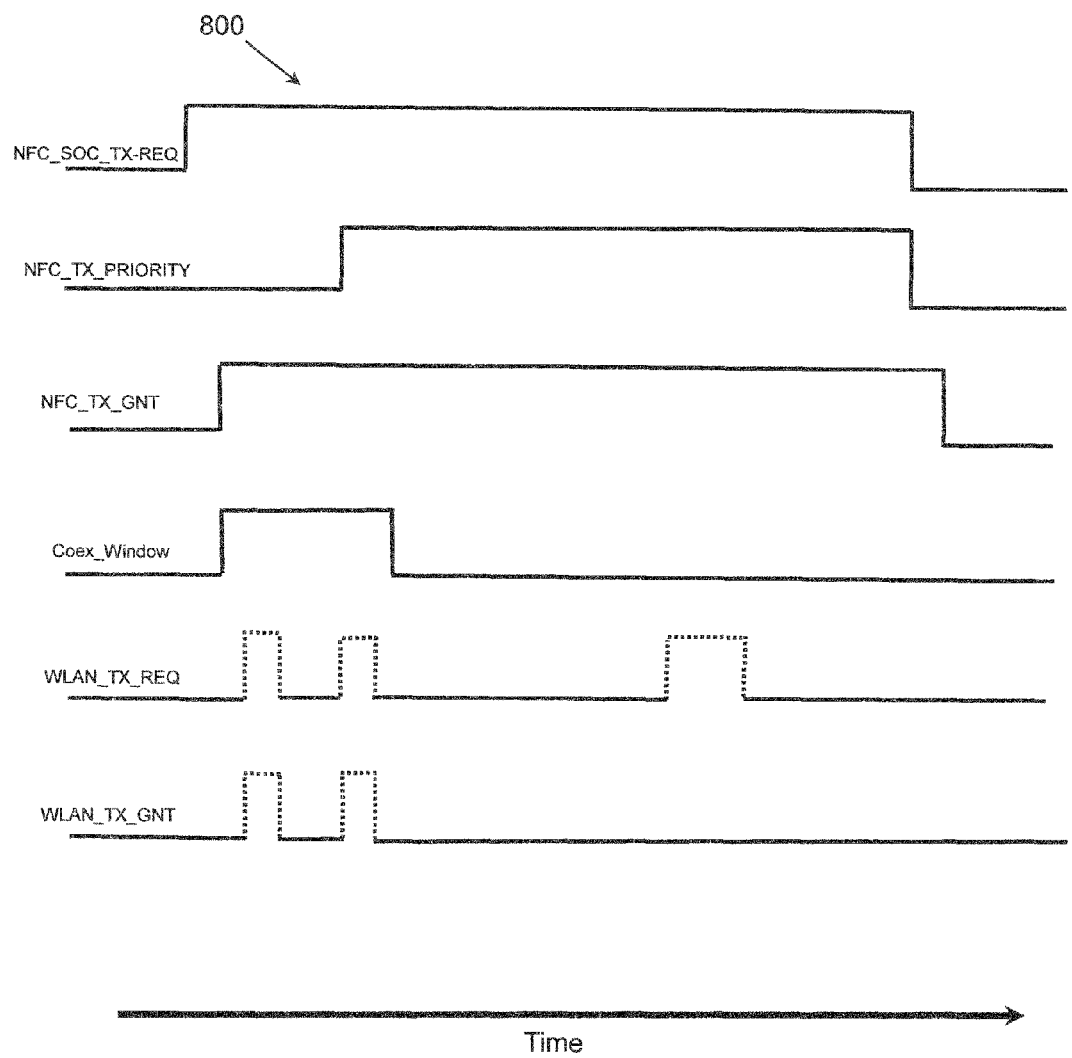
FIG. 8 illustrates a timing diagram that outlines one embodiment of packet arbitration for thermal management.

FIG. 8 illustrates another timing diagram 800 that outlines an aspect of one embodiment of a thermal management protocol performed by the arbiter logic 130 (FIG. 1) when the thermal management mode is active. In particular, FIG. 8 illustrates a coexistence window that may be enabled to allow simultaneous transmission of a short, high priority WLAN during NFC packet transmission. A relatively short coexistence window is created early in the time period in which NFC transmission is occurring. At this time during NFC transmission, heating effects have not yet become significant. When a high priority request for a short WLAN transmission is received during the coexistence window, the WLAN packets are allowed to be transmitted. When the coexistence window is not active, a request to transmit WLAN packets is denied.

The priority of WLAN packets that will be allowed to transmit during the coexistence window may be programmable.

In another embodiment, the described methods and/or their equivalents may be implemented with computer executable instructions. Thus, in one embodiment, a non-transitory computer-readable medium is configured with stored computer executable instructions that when executed by a machine (e.g., arbiter logic 130, arbiter logic circuit 735, CPU 745, processor, computer, and so on) cause the machine (and/or associated components) to execute the thermal management protocol described in FIGS. 1-8.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or the claims, it is intended to be inclusive of all elements, not just individual elements. For example, the phrase "A or B" is intended to include the following options: i) A alone, ii) B alone, and iii) both A and B.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a first source configured to transmit first packets;
a second source configured to transmit second packets; and
an arbiter logic configured to:
input a thermal management mode by which each of the first source and the second source is to respectively transmit the first packets and the second packets, wherein the thermal management mode is selected based, at least in part, on a thermal consequence of simultaneous transmission of the first packets from the first source and the second packets from the second source; and
select either i) the first packets, ii) the second packets, or iii) both the first packets and the second packets for transmission based, at least in part, on the thermal management mode input by the arbiter logic.

2. The apparatus of claim 1, comprising a processor configured to select the thermal management mode based on a predicted temperature of the apparatus that results from simultaneous transmission of the first packets from the first source and the second packets from the second source.

3. The apparatus of claim 2, wherein the processor is configured to compute the predicted temperature based, at least in part, on power consumed during transmission of packets from the first source combined with power consumed during transmission of packets from the second source.

4. The apparatus of claim 2, wherein the processor is configured to select the thermal management mode based, at least in part, on an ambient temperature.

5. The apparatus of claim 1, wherein the arbiter logic is configured to, when the thermal management mode is not active, transmit both the first and second packets simultaneously.

6. The apparatus of claim 1, wherein the arbiter logic is configured to, when the thermal management mode is active, transmit either the first packets or the second packets, such that the first packets and the second packets are not transmitted simultaneously.

7. The apparatus of claim 1, wherein the arbiter logic is configured to select packets for transmission based, at least in part, on a first priority that is associated with the first packets and a second priority that is associated with the second packets.

8. The apparatus of claim 1, wherein one of the first source and the second source is a near field communication (NFC) circuit and the other one of the first source and the second source is a wireless local area network (WLAN) circuit.

9. A method, comprising:
receiving a first request from a first source to transmit first packets;
receiving a second request from a second source to transmit second packets;
inputting a thermal management mode by which each of the first source and the second source is to respectively transmit the first packets and the second packets, wherein the thermal management mode is selected based, at least in part, on a thermal consequence of simultaneous transmission of the first packets from the first source and the second packets from the second source; and selectively transmitting either i) the first packets, ii) the second packets, or iii) both the first packets and the second packets for transmission based, at least in part, on the thermal management mode.

10. The method of claim 9, further wherein the thermal management mode is selected based, at least in part, on power consumed during transmission of packets from the first source combined with power consumed during transmission of packets from the second source.

11. The method of claim 9, further comprising selecting the thermal management mode based on an ambient temperature of a communication device.

12. The method of claim 9, wherein when the thermal management mode is not active, transmitting both the first and second packets simultaneously.

13. The method of claim 9, wherein when the thermal management mode is active, transmitting either the first packets or the second packets, such that the first packets and the second packets are not transmitted simultaneously.

14. The method of claim 9, wherein when the thermal management mode is active, transmitting either the first packets or the second packets, based, at least in part, on a first priority that is associated with the first packets and a second priority that is associated with the second packets.

15. An integrated circuit, comprising:
a first source configured to transmit first packets;
a second source configured to transmit second packets;
an arbiter logic configured to input a thermal management mode by which each of the first source and the second source is to respectively transmit first packets and second packets, respectively, wherein the thermal management mode is selected based, at least in part, on a thermal consequence of simultaneous transmission of the first packets from the first source and the second packets from the second source; and wherein the arbiter logic is further configured to selectively transmit either i) the first packets, ii) the second packets, or iii) both the first packets and the second packets for transmission based, at least in part, on the thermal management mode.

16. The integrated circuit of claim 15, further comprising a processor configured to select the thermal management mode based, at least in part, on power consumed during transmission of packets from the first source combined with power consumed during transmission of packets from the second source.

17. The integrated circuit of claim 15, further comprising a processor configured to select the thermal management mode based at least in part, on an ambient temperature of a communication device.

18. The integrated circuit of claim 15, wherein when the thermal management mode is not active, the arbiter logic is configured to transmit both the first and second packets simultaneously.

19. The integrated circuit of claim 15, wherein when the thermal management mode is active, the arbiter logic is configured to transmit either the first packets or the second packets, such that the first packets and the second packets are not transmitted simultaneously.

20. The integrated circuit of claim 15, wherein when the thermal management mode is active, the arbiter logic is configured to transmit either the first packets or the second packets, based, at least in part, on a first priority that is associated with the first packets and a second priority that is associated with the second packets.

* * * * *